DEVICE FOR TYING ENDS OF BAGS

Original Filed July 19, 1971 2 Sheets-Sheet 1

ARIBERT J. LEHMANN
INVENTOR.

BY Thos M. Nelson
ATTORNEY

DEVICE FOR TYING ENDS OF BAGS

Original Filed July 19, 1971 2 Sheets-Sheet 2

ARIBERT J. LEHMANN
INVENTOR.

BY B. McKelland
ATTORNEY

United States Patent Office

Re. 28,170
Reissued Sept. 24, 1974

28,170

DEVICE FOR TYING THE ENDS OF BAGS

Aribert J. Lehmann, 473 West End Ave.,
New York, N.Y. 10024

Original No. 3,729,896, dated May 1, 1973, Ser. No. 163,574, July 19, 1971. Application for reissue July 9, 1973, Ser. No. 377,785
Int. Cl. B65b *51/06*
U.S. Cl. 53—198 A 7 Claims

Matter enclosed in heavy brackets [ ] appears in the original patent but forms no part of this reissue specification; matter printed in italics indicates the additions made by reissue.

ABSTRACT OF THE DISCLOSURE

A device for tying the end of a bag with an adhesive tape strip severed from a tape roll, in which a slot is provided for the movement of the compressed end of a bag. A star wheel is mounted adjacent the inlet end of the slot with its poke ends overlapping the slot and serving to support the tape with its adhesive side outwardly facing. A curved spring is held by one end in close proximity of the spoke ends disposed over the slot, with its free end terminating at a midpoint of the slot width, on the inner side of the star wheel. A tape severing means, movable into severing position by the passage of a bag neck through the slot is arranged to sever the tape around the bag neck from the roll at a point spaced inwardly from the free end of the spring.

The present invention relates to the packaging art, and, more specifically to a device for mechanically tying the open ends of loaded bags, particularly, synthetic plastic bags.

Many products are commercially packaged, for retailing, in open ended, clear or partly clear synthetic plastic bags, whose open ends are then tied up by longitudenally compressing them and wrapping a strip of pressure-adhesive tape around the compressed bag end, the end extensions of the wrapped portion of the strip being adhered to one another by their coated faces.

Such tying of loaded bags is effected by a device or mechanism on which a roll of pressure-adhesive tape is mounted. The open end portion of the bag is manually longitudinally compressed into a neck-like formation which is pressed against the adhesive coated side of the tape and passed through a slot in the device, during which passage the tape is formed into a ring around the neck with extensions that are parallel and face one another with their coated sides and are adhered to one another along their entire lengths. The movement of the neck through the slot automatically causes a knife to sever the adhered tie ends from the tape; after which the tied bag is removed from the slot.

While the tying devices and methods of the prior art provide effective, efficient, and secure closures for the loaded bags, they suffer from over-effectiveness. These methods of devices form a tying closure that is generally impossible to open manually. The adhering tie extensions cannot be separated except with the greatest difficulty, if at all, so that it is difficult if not impossible to remove the tie from around the compressed neck of the bag, and the bag can only be opened by either cutting the tape close to the neck or by simply tearing the bag. A sequel to this difficulty is the general impossibility to retie the bag, since either the tape or the bag itself have been mutilated during the initial opening.

It is the primary object of the present invention to provide bag tying devices, of the character described, which will form a tying closure around a loaded bag that may be readily manually disengaged from the bag, without damage to either the tying tape strip or to the bag itself, thus rendering the untying of the bag a relatively simple operation and also making it possible to retie it with the same or another strip of pressure adhesive tape.

It is another object of the present invention to provide a device of the character described which is of relatively simple construction and simple and easy to operate.

It is still another object of the present invention to provide a device of the character described which is compact, of light weight and of attractive appearance.

It is a further object of the present invention to provide a device of the character described which is economical to produce and which, because of its other aforestated advantages, may be economically and conventiently used in the home, as well as commerically.

The foregoing and other objects and advantages of the bag tying device of the present invention will become more readily apparent to those skilled in the art from the embodiment thereof shown in the accompanying drawing and from the description following. It is to be understood, however, that such embodiment is shown by way of illustration only, to make the principles and practice of the invention more readily comprehensible, and without intent of limiting the invention to the specific details therein shown.

Figure 3:
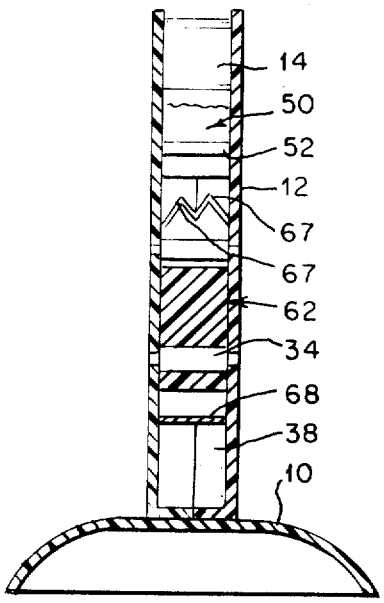
FIG. 3 is a vertical section taken on line 3—3 of FIG. 2, with the bag removed.

Broadly stated, the device of the present invention departs from those of the prior art in that, in tying the bags, it leaves the ends of the closure ring extensions spaced from and unadhered to one another, to provide tabs angularly disposed relative to one another that afford a purchase for the fingers of a person's hands for separating the extensions from one another and for removing the ring from around the neck of the bag. Such result permits the opening of a tied bag without damaging either the tying tape or the bag proper and permits the reclosure of the bag, with the same tape section that was removed therefrom or with another tape section, or other tying means.

More specifically, the device as illustrated in the drawings, comprises a base, 10, on which are set a pair of parallel upright walls, 12, spaced apart a distance equal to the thickness of a roll of pressure-adhesive tape, 14, which may be rotatably supported between them, at an upper corner, as on the circular ribs, 16 formed on the inner faces of the walls 12, over which the core 18 of the tape roll may be snap-fitted.

The walls 12 are formed with registering, generally upright slots, at a midpoint thereof, extending downwardly from their upper edge. Each slot is formed with a substantially vertical, relatively short upper section, 20, a relatively short diagonal, preferably slightly curved portion, 22, extending in the direction of ribs 16, and a relatively longer vertical, lower portion, 24, having a laterally offset portion, 26, at its end extending in the direction opposite to ribs 16 and preferably terminating in an enlarged, circular portion, 28.

Walls 12 are provided on their edges on the side of the slot opposite the ribs 16, or on the right side, as shown in the drawings, with facing offset flanges that register and about to form bracing side wall, 32, and top wall, 34. Similar flanges are provided on the lower portions of opposed side edge of walls 12, which form a bracing wall, 36; the upper cover edges on the left of the slot are without any flanges, to leave an opening for the insertion and removal of a roll of tape.

Additional bracing means may be provided on walls 12, intermediate their edges, which included the registering and abuting ribs 38, to the right of the slot, which may extend downwardly from top wall section 34, to have its lower end curve around the outer portion of the circular slot-enlargement 28.

The spacing and bracing means also include a plurality of studs extending between wall 12. These include registering stud sections 40, intermediate the slot and the ribs 16; stud sections, 42, on the right side of the slot, immediately below the top wall section 34 between the slot and the bracing ribs 38; stud sections 44 along the lower half of slot section 24, to the left thereof; and stud sections, 46, closely adjacent to side wall section 36, at its upper end. For convenience and rigidity of assembly, one of each pair of registering studs may be formed with a recess, 48, in its end, while the other may be formed with a pin extension (not shown) that may fit into such recess. Studs 40, 42, 44 and 46, may all be cylindrical, particularly studs 40 and 44, and may each serve a double purpose.

Thus, studs 40 serve to rotatably support, by its hub, a star wheel, 50, having the spokes, 52, separated by recesses, 54, which may preferably have circular inner ends and may widen outwardly; each recess 54 being adapted to receive therewithin the longitudinally compressed end or neck, 56, of a bag. The star wheel 50 is of such diameter and studs 40 are so positioned that the spokes, 52 extend across at least part of the width of the slot portions 20 and 22.

Studs 42 serve to anchor against top wall section 34, the flat end, 58, of a leaf spring, having the curved extension, 60, that depends therefrom opposite the slot and curves around the ends of the spokes 52, along slot sections 20 and 22, to a point opposite approximately the center of the width of slot section 24.

Studs 44 serve as a pivot for the bell crank, generally designated as 62, having the upper arm 64, and the lower arm, 66, which extend in the direction of slot section 24 and may be alternately moved to lie across it. The end of the upper arm 64, carries, or is formed with a knife edge, 67, which may preferably be of tapered shape, for ease of cutting.

Studs 46 served to anchor one end of a curved leaf spring, 68, whose other end engages against the lower arm 66 of bell crank 62 to normally maintain it across slot section 24, to thereby retain the end of the upper arm 66 and its knife end 67, out of alinement with the slot. Stop pens, 80, may be provided to the left of the slot and of upper bell crank arm 64, to limit its movement away from the slot.

Figure 4:
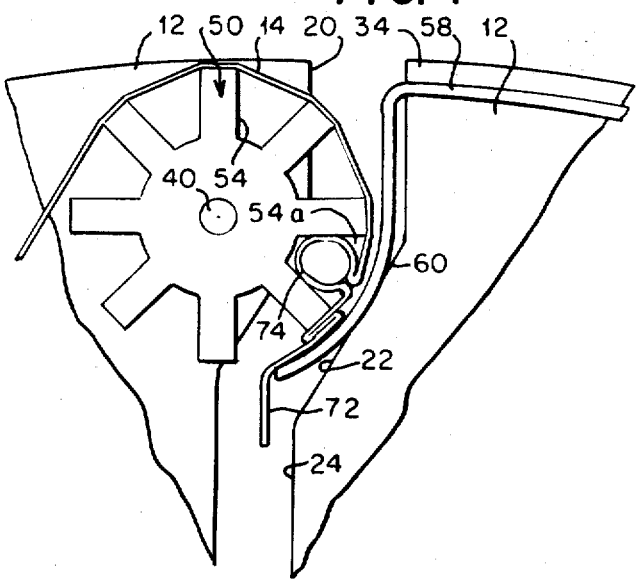
FIG. 4 is a fragmentary, elevational view of the device of FIG. 2, on an enlarged scale, showing a second step in the tying of the bag.
Figure 1:
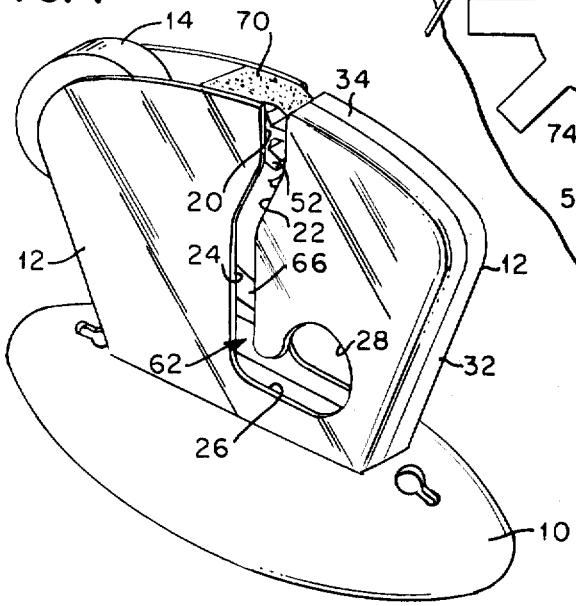
FIG. 1 is a perspective view of one embodiment of a bag tying device of the present invention.

To operate the device of the invention, a roll of tape 14 adhesively coated on one side is mounted over ribs 16, in position to have its coated side 70 (FIG. 1) upwardly facing, and its end portion is passed over the star wheel 50, being passed around the circumference of the star wheel between the ends of its spokes 52, and the curved extension 60 of the leaf spring with an end 72, projecting beyond the end of the spring. The end of a loaded bag is then longitudinally compressed, as by slightly twisting, to form the neck section 56, which is introduced into the upper portion 20 of the slot and then pressed downwardly. Such movement will cause the neck 56 to encounter one of the spokes 52 and to be pressed into the recess 54a above it. As neck 56 will be in contact with the adhesive coated face 70 of the tape, it will push the tape area with which it is in contact inwardly into the recess (FIG. 2), causing the roll of tape to unwind. As the neck 56 is pressed further downwardly through the slot, along the diagonal portion 22 thereof, the tape will be wound around the neck to form the ring 74, and folding the tape on itself both, above and below the neck 56 (FIG. 4).

Figure 5:
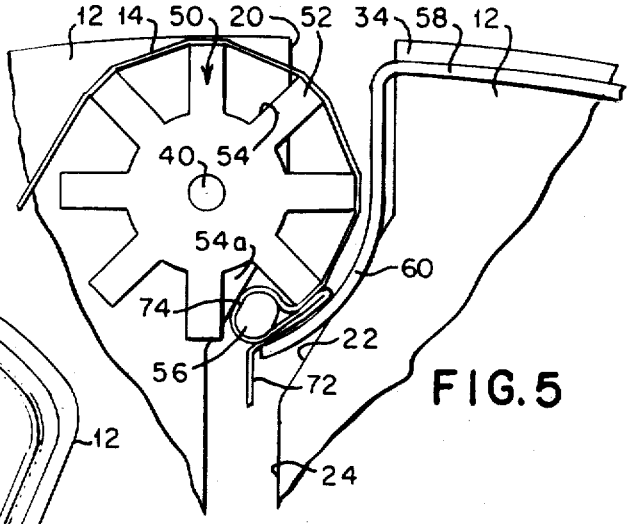
FIG. 5 is a view similar to that of FIG. 4, showing a succeeding step in the tying of the bag.

As the tape is continued to be pressed downwardly in the slot 54a, the fold of the tape above the neck will be straightened out and the fold below it will be lengthened as seen in FIG. 5 of the drawing. Thereafter, further depression of the neck 56 will cause it to be withdrawn from the recess 54 into which it was initially inserted, and its pressure will cause the tape end 72 projecting beyond the curved spring section 60 to be pressed to the right around the end edge of the spring section 60. Continued movement of the neck 56 downwardly, through slot section 24, will cause it to encounter lower bell crank arm 66 and its pressure on that arm will tilt the bell crank to cause its upper arm 64 to move to the right and its knife end 67 to cut the tape section that connects the tape ring 74 around the neck 56 to the roll of tape 14.

Figure 2:
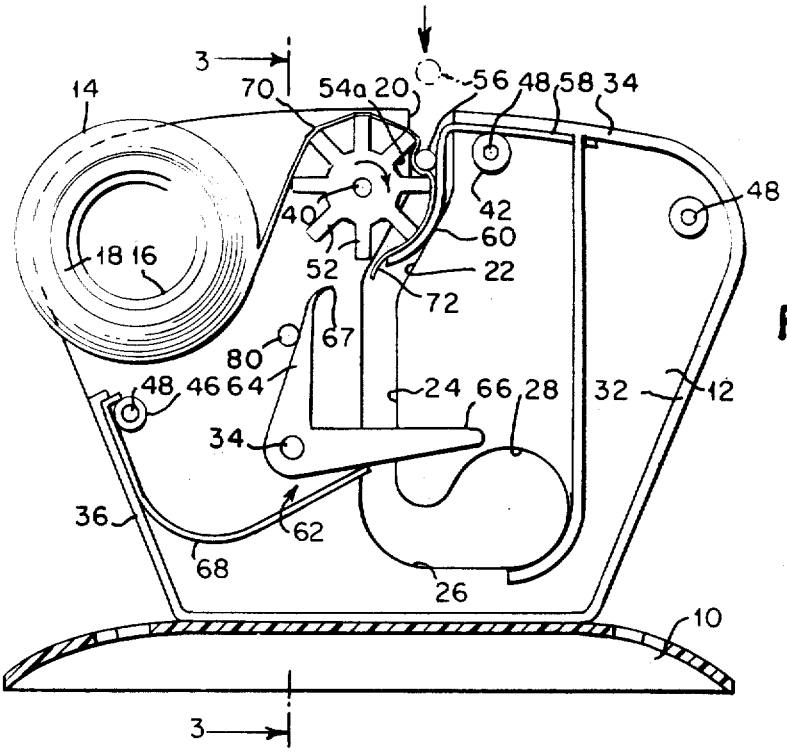
FIG. 2 is an elevational and partly sectional view of the same, with a wall removed and showing a bag end in an initial step of being tied.
Figure 7:
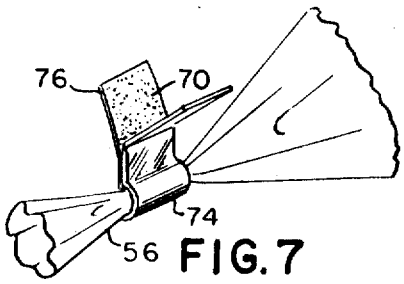
FIG. 7 is a fragmentary view of the end of a bag tied by the device of the present invention.
Figure 6:
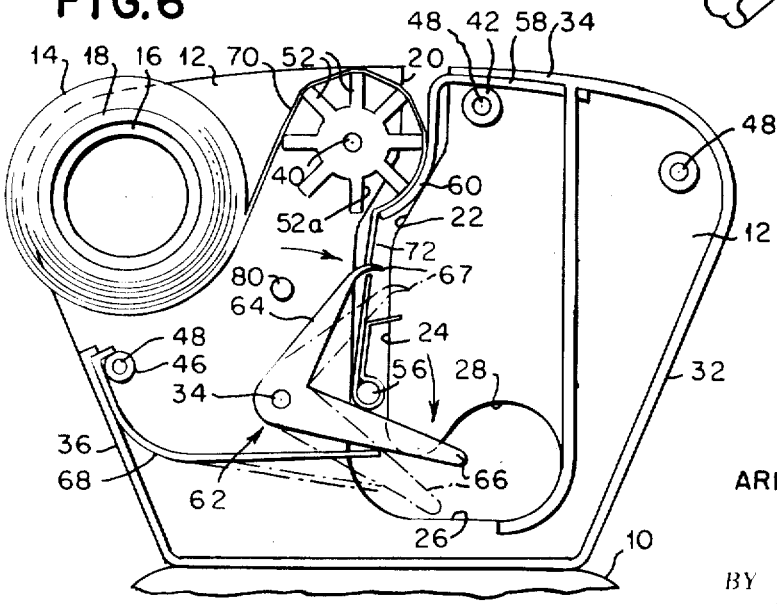
FIG. 6 is an elevational view of the device, as shown in FIG. 2, showing the final step in the tying of the bag; the broken lines indicating its path for removal from the device.

It will be seen that as the neck is moved downwardly through the slot portion 24, that portion of the tape fold which lies against the curved spring 60 (FIG. 5), will be straightened out and caused to adhere against the portion of the tape connecting the ring 74 to the roll of tape 14, except for its projecting end 72, which will be offset from the connecting tape portion so that the knife 67 cuts through the tape section connecting the ring 74 to the roll of tape, at a point below the end of the curved spring section 60 and above the point of offset of tape end 72, and there will be provided a ring closure around the neck with extensions at each end thereof, parts of which extensions are adhered but the ends of which, 76 and 72, are unadhered and are disposed at an angle to one another, as more or less schematically shown in FIG. 2 and, on an enlarged scale, in FIG. 7.

Continued movement of the neck 56, after severance of the tape will move the lower bell crank arm 66 out of the way of the slot to permit the movement of the neck into the lower slot section 26 and into the enlargement 28 through which the tied neck of the bag may be withdrawn.

It may here be stated that the device of the present invention may be formed of any suitable material; preferably, for economy of production of the parts and for ease of assembly and for lightness of weight, it may be formed, as by molding of synthetic plastic material; including the star wheel, the rocker arm, and the several springs, as well as the cutting edge 67.

This completes the description of the device of the present invention. It will be readily apparent that such device is of relatively simple construction; may be economically produced and assembled, and is compact and of light weight. It will also be apparent that the device of the invention is simple, easy, and convenient to use and may, therefore be used in the home as well as commercially. It will likewise be apparent that the device forms tape closures for the ends of loaded bags that may relatively easily be opened without damage to the closure or the bag, and, therefore, permits the reclosure of the bag either with the same tape or with another strip of tape or with other means, to the great convenience of noncommercial users.

It will be further apparent that numerous variations and modifications may be made in the bag closing device of the invention, by one skilled in the art, and in accordance with the principles of the invention hereinabove set forth and without the exercise of any inventive ingenuity.

I claim:

1. A device for tying the ends of loaded bags with a strip of adhesive tape, comprising a wall supported [by] *at* one [edge] *end* on a base [,] ; a slot extending from the opposed [edge] *end* of the wall inwardly to a point short of said supported [edge] *end;* means on said wall to one side of said slot for rotatably supporting a roll of tape [,] ; means on said wall to said *one* side of said slot for rotatably supporting a star wheel; a star wheel mounted on said *star wheel supporting* means, said star wheel having radially extending spokes separated by recesses adapted to receive the longitudinally compressed end of a bag, said star wheel supporting means arranged to support said star wheel with the ends of its spokes extending [over] *in proximity to* said slot [,] ; a spring member supported on said wall to the other side of said slot, said spring member having a curved portion disposed in close proximity to the ends of said spokes, [overlying said slot, said spring terminating at a point at approximately the center of the width of said slot,] *the tape from the roll partially folding over itself to form a tape fold defining a ring around the neck of the bag with said ring including a first tape end when the longitudinal compressed end of the bag is inserted into said recesses;* tape severing means mounted on said wall, said severing means engageable by the neck of [a] *the* bag moving through said slot to be moved from a position away from said slot to cross said slot to sever [a] *the* tape [section] from [a] *the* roll [of tape would around said neck] at a point between said neck and the end of said spring [and spaced from the end of said spring] *and above the tape fold to provide a second tape end of said ring without severing said first tape end thereby providing a closure around said neck with said first and second tape ends unadhered to and at an angle with each other to facilitate the opening of said closure* [to leave a free-hanging tape end at the end of said spring] ; and means automatically returning said severing means to said first position after disengagement from said bag neck.

2. The device of claim 1 wherein a second wall is supported on said base in spaced parallel relation to said wall, said second wall having a slot formed therein in register with the slot of said wall, said tape, said star wheel, said spring member and said neck engageable means supported between said walls.

3. The device of claim 1 wherein said slot comprises relatively offset outer and inner portions connected by a diagonally extending portion, said [teeth] *spokes* projecting across said diagonally extending slot portion.

4. The device of claim 1 wherein said slot is formed with a laterally offset portion on its inner end, said laterally offset portion having an enlarged end portion.

5. The apparatus of claim 2, wherein said tape severing means comprises a bell crank lever pivotally supported between said walls in position to have its arms extend in the direction of said wall; said bell crank lever having one of its arms provided with a tape cutting edge at one end and arranged with said arm in greater proximity to the end of said spring than its other arm; resilient means normally maintaining said one arm in position away from said slots and its other arm across said slots; said arms arranged at an angle to one another whereby the cutting end of said one arm is moved across said slots when said other arm is moved from across said slots by a bag neck moved therethrough.

6. The apparatus of claim 5, wherein said means maintaining said bell crank in normal position comprises a curved spring secured by one end of said walls with its other end engaging the outer surface of said lower arm of said bell crank.

7. The apparatus of claim 5, wherein said means mounting said star wheel and said bell crank lever each comprise cooperating registering cylindrical studs portions on said walls; said cooperating cylindrical studs forming axles upon which said star wheel and said bell crank lever are mounted for rotation.

References Cited

The following references, cited by the Examiner, are of record in the patented file of this patent or the original patent.

UNITED STATES PATENTS

| | | | |
|---|---|---|---|
| 2,916,863 | 12/1959 | Leighton et al. | 53—198 A |
| 3,221,468 | 12/1965 | Casey | 53—198 A |

TRAVIS S. McGEHEE, Primary Examiner

J. SIPOS, Assistant Examiner

U.S. Cl. X.R.

53—138